United States Patent [19]

Schulz et al.

[11] 3,994,558

[45] Nov. 30, 1976

[54] BINOCULAR MICROSCOPE WITH IMPROVED MONOCULAR PHOTOGRAPHIC AND MEASURING CAPABILITY USING MOVABLE OBJECTIVE

[75] Inventors: Luitpold Schulz, Widnau; Andreas Schaefer, Balgach, both of Switzerland

[73] Assignee: Wild Heerbrugg Aktiengesellschaft, Heerbrugg, Switzerland

[22] Filed: June 23, 1975

[21] Appl. No.: 589,183

[30] Foreign Application Priority Data

July 4, 1974 Switzerland.......................... 9153/74

[52] U.S. Cl..................................... 350/36; 350/247
[51] Int. Cl.²...................... G02B 21/20; G02B 7/02
[58] Field of Search................... 350/36, 35, 45, 19, 350/39, 38, 37, 247, 44; 354/79

[56] References Cited
UNITED STATES PATENTS

| | | | |
|---|---|---|---|
| 1,862,031 | 6/1932 | Patterson | 350/39 |
| 3,417,685 | 12/1968 | Kato et al. | 350/19 |
| 3,679,287 | 7/1972 | Takahasi et al. | 350/39 |
| 3,704,932 | 12/1972 | Schick | 350/36 |

Primary Examiner—John K. Corbin
Assistant Examiner—Jon W. Henry
Attorney, Agent, or Firm—William R. Woodward

[57] ABSTRACT

The main objective of the microscope is shifted from the stereoscopic viewing position to a position in which its optic axis coincides with the optic axis of one of the twin variable magnification optical systems used for stereoscopic viewing. This shifted position provides better resolution for photography and measurement and reduces the correction requirements on the main objective. The shift of the objective is coordinated with a shift of the object under observation or a countershift of the upper part of the microscope in order to maintain the same field of view of the object.

5 Claims, 1 Drawing Figure

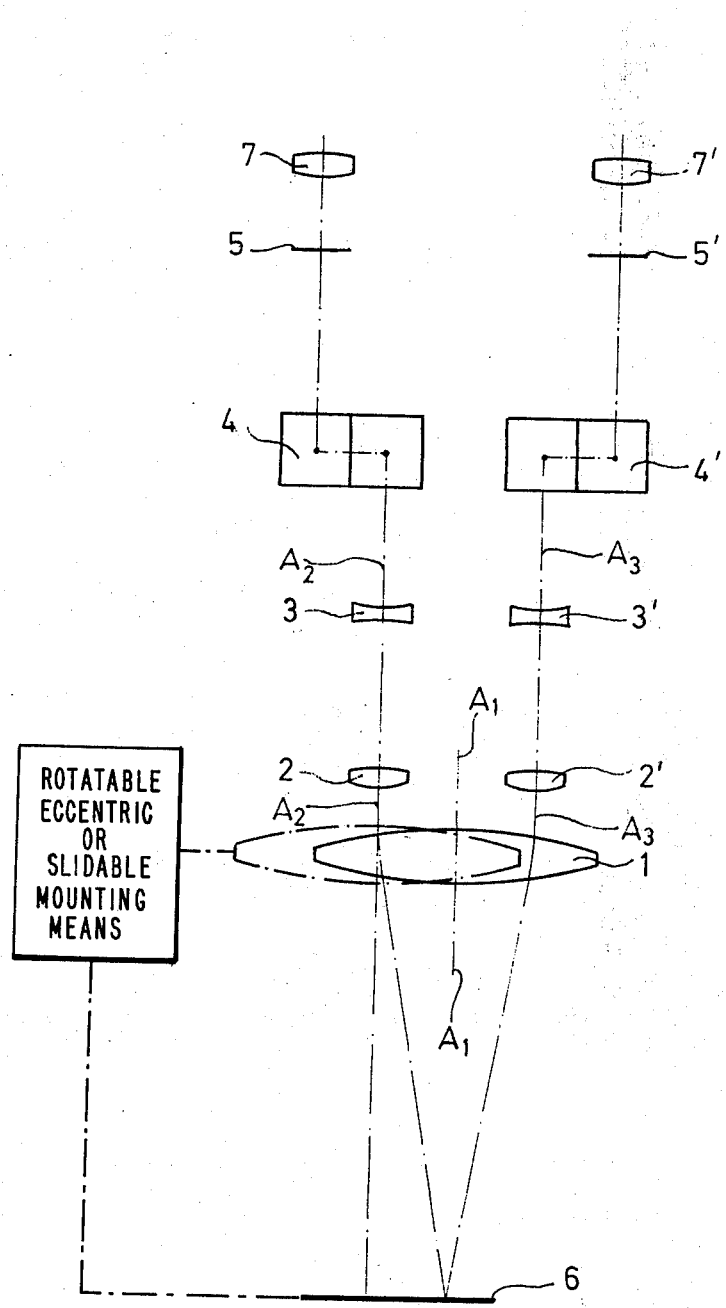

BINOCULAR MICROSCOPE WITH IMPROVED MONOCULAR PHOTOGRAPHIC AND MEASURING CAPABILITY USING MOVABLE OBJECTIVE

This invention relates to a stereomicroscope of the kind in which a main objective is used with a twin variable magnification binocular system.

Stereomicroscopes of this type are known. In these instruments the direction of view through the main objective to the object under observation in the object plane uses eccentric rays through the objective falling obliquely on the object. Only in this way does the observer have the possibility of obtaining a spatial impression of the observed object. In order to obtain monocular individual photographs of the objects observed, supplementary camera attachments are used.

Stereomicroscopes are frequently used for measurements, blood counts and similar determinations.

A disadvantage of these known stereomicros lies in the fact that the direction of viewing passes eccentrically through the main objective and falls obliquely on the object to be measured or photographed. For this reason, the photographs obtained are seriously deteriorated. Measuring errors arise in the measurement of distances as the result of parallax and of oblique projection. For this reason, stereomicroscopes have been used only for measuring tasks of low accuracy requirements.

In order to avoid this disadvantage, it has already been proposed that in the variable magnification system used with the objective, a triplet of identical variable magnification systems should be used instead of the usual twin systems, the third being the central system between the two used for binocular viewing that is rotationally symmetrical with the main objective. Since in modern stereo microscopes variable magnification is generally carried out in continuous fashion with so-called zoom objectives, great design and manufacture costs are involved in the provision of the optical and mechanical components of the variable magnification system. For these reasons the proposed solution of providing a triplicate magnification system has not worked out in practice.

It is an object of the present invention so to improve a stereomicroscope that for measuring and for photography, the principal ray from the object observed coming perpendicularly through the main objective will come within the scope of the variable magnification optical system.

SUBJECT MATTER OF THE PRESENT INVENTION

Briefly, means are provided to change the relative position of the main objective with regard to at least one of the twin variable magnification optical systems in a stero microscope, so that the optical axis of the main objective can be brought into alignment with the optical axis of one of the two twin variable magnigication systems. This is preferably done by moving the main objective relative to the casing of the twin variable magnification optical systems, and that may be done in coordination with a shift of the object under observation to prevent too great a change of the field of view between stereo viewing and photography.

The invention is further described by way of example with reference to the annexed drawing in which the single FIGURE is a diagram of the optical system of a stereomicroscope according to the present invention.

The main objective is designated 1 in the drawing. Above the main objective 1 are twin variable magnification optical systems consisting respectively of the lenses 2, 3 and 2',3'. These twin optical systems geometrically subdivide the rays entering through the main objective and respectively lead the two ray bundles through erecting prisms 4 and 4' to intermediate image planes 5 and 5' respectively. As the result of the provision of the erecting prisms 4 and 4', monocular images that are unreversed laterally and vertically of the object under observation lying in the object plane 6 are produced. Eyepieces 7 and 7' serve for viewing the projected monocular images in the intermediate image planes 5 and 5' respectively. By means of a mechanical arrangement symbolically shown by the dashed line 10, the position of the main objective 1 can be so changed that its optical axis $A_1-A_1$ coincides with one of the optical axes of the respective twin variable magnification systems, in the example shown the axis $A_2-A_2$ which is the optical axis of the system comprising the lenses 2 and 3. When the main objective 1 is shifted to that position, which is shown with a dot-dash line in the FIGURE, the central or principal ray from the object plane 6 through the main objective is a ray that also goes perpendicularly through the center of the lenses 2 and 3, which is to say that the optic axes of the lenses 1, 2 and 3 coincide.

The mechanical arrangement for changing the position of the main objective can be a mounting that can be slid in a guide by half the distance between the optical axes $A_2-A_2$ and $A_3-A_3$ of the respective twin optical systems 2, 3 and 2',3'. It is also possible to mount the main objective 1 in a rotatable eccentric mounting 11 that can be rotated by 180° relative to the casing of the twin optical systems, in which case the spacing between the optical axis $A_1-A_1$ of the main objective and the axis of rotation of its mounting amounts to half the spacing between $A_1-A_1$, and one of the respective optical axes of the twin variable magnification optical systems.

It is not absolutely necessary to change the position of the main objective in the instrument. It is also conceivable that the position of the main objective should remain unchanged and that the position of one or both of the twin variable magnification optical systems could be changed.

A substantial advantage of the invention lies in the fact that when a photographic camera is mounted either on the tubus of the microscope or between the tubus and the variable magnification system, perfect monocular individual photographs can be made. A further advantage lies in the fact that no errors arise through parallax or oblique projection when measurements are made when the microscope of the present invention is in its measuring and photographing configuration.

For visual observation, the requirements for the main objective are not as exacting as for measurements and for photography. For this reason, there is a further advantage in the invention that lower requirements are set for the correction of the main objective if photography is always done with the principal rays passing perpendicularly through the center of the main objective. This results in considerable cheapening of the manufacture of the optical elements of the microscope.

When the position of the main objective is changed, a different field of view (different picture section) of an object in the object plane is projected on the intermediate image plane (the image plane 5 in the example illustrated). In order to correct for this change, the object is simply moved by the same length in the same direction as the main objective, as indicated by the dashed line 10 in the FIGURE, or else the upper portion of the stereomicroscope is shifted by the same distance but in the opposite direction.

The provision of a mechanical linkage to produce simultaneously a change of position of the main objective and a correction movement of the object or of the binocular microscope upper portion by coupling the two movements so that both functions can be accomplished by actuating a single operating lever in order to convert the microscope from the binocular viewing position to the photographing and measuring position can be so readily devised that it need not be further described here.

We claim:

1. A stereomicroscope comprising a main objective and twin variable magnification optical systems arranged for stereoscopic viewing through said main objective and further comprising means for producing relative displacement of said main objective and at least one of said twin optical means with respect to each other between a monocular viewing position in which the optical axis ($A_1$—$A_1$) of said main objective (1) is coincident with the optical axis ($A_2$—$A_2$) of one (2, 3) of said twin optical systems to minimize errors of parallox and oblique projection and a stereoscopic viewing position in which said optical axis ($A_1$—$A_1$) of said main objective (1) is equidistant between the optical axes ($A_2$—$A_2$, $A_3$—$A_3$) of said twin optical systems (2,3; 2′,3′).

2. A stereomicroscope as defined in claim 1, in which said means for producing relative displacement is constituted by means for moving said main objective relative to said twin optical systems.

3. A stereomicroscope as defined in claim 2, in which said main objective is mounted on a sliding carriage and said sliding carriage is laterally movable in a guide fixed in the casing of the twin variable magnification optical means.

4. A stereomicroscope as defined in claim 2, in which said main objective is eccentrically mounted in a rotatable mounting located in front of the variable magnification twin optical means.

5. A stereomicroscope as defined in claim 2, in which means are also provided for movement of the object under observation in coordination with the operation of said means for moving said main objective.

* * * * *